United States Patent
Simanapalli et al.

(10) Patent No.: US 8,498,326 B1
(45) Date of Patent: Jul. 30, 2013

(54) METHOD AND APPARATUS FOR FORWARD ERROR CORRECTION

(75) Inventors: Siva Simanapalli, Santa Clara, CA (US); Julien D. Pons, Metuchen, NJ (US); Arnaud Charton, Livermore, CA (US); Karl Yick, Alameda, CA (US); Qasem Aldrubi, Fremont, CA (US); Hossein Dehghan-Fard, Danville, CA (US)

(73) Assignee: Ikanos Communications, Inc., Fremont, CA (US)

(*) Notice: Subject to any disclaimer, the term of this patent is extended or adjusted under 35 U.S.C. 154(b) by 384 days.

(21) Appl. No.: 12/804,545

(22) Filed: Jul. 23, 2010

Related U.S. Application Data

(60) Provisional application No. 61/227,869, filed on Jul. 23, 2009.

(51) Int. Cl.
*H04L 27/00* (2006.01)

(52) U.S. Cl.
USPC ........... 375/219; 375/259; 375/262; 375/265; 375/285; 375/350; 714/792; 714/795; 714/796

(58) Field of Classification Search
USPC ............... 375/219–220, 222, 259–260, 262, 375/265, 285, 295, 316, 340–341, 346, 350; 370/525–526; 714/786, 792, 795, 796
See application file for complete search history.

(56) References Cited

U.S. PATENT DOCUMENTS

| | | | |
|---|---|---|---|
| 6,976,202 B1 | 12/2005 | Rezvani | |
| 7,191,387 B1 | 3/2007 | Massoudi | |
| 7,532,666 B1 | 5/2009 | Rezvani | |
| 7,881,362 B2 * | 2/2011 | Shridhar et al. | 375/219 |
| 2005/0058048 A1 * | 3/2005 | Park et al. | 369/59.17 |
| 2005/0169358 A1 * | 8/2005 | Redfern et al. | 375/222 |
| 2009/0129229 A1 * | 5/2009 | Park et al. | 369/59.22 |
| 2011/0211624 A1 * | 9/2011 | Van De Wiel et al. | 375/222 |

* cited by examiner

*Primary Examiner* — Jean B Corrielus
(74) *Attorney, Agent, or Firm* — Mark J. Danielson; Pillsbury Winthrop Shaw Pittman, LLP

(57) ABSTRACT

A multi-tone transceiver with a components forming a transmit path and a receive path configured to couple via a subscriber line to an opposing multi-tone transceiver for frequency division multiplexed multi-tone modulated communications therewith is disclosed. A noise margin channel identifier is configured to identify within a received tone set, discrete tones each associated with a corresponding one of at least two channels differing from one another in a relative noise margin of associated tones. A Viterbi decoder is responsive to the channel identification provided by the noise margin channel identifier to discretely decode each of the at least two channels; thereby improving the fidelity of the error correction provided by the Viterbi decoder by discretely processing the identified channels within the received set of tones.

22 Claims, 7 Drawing Sheets

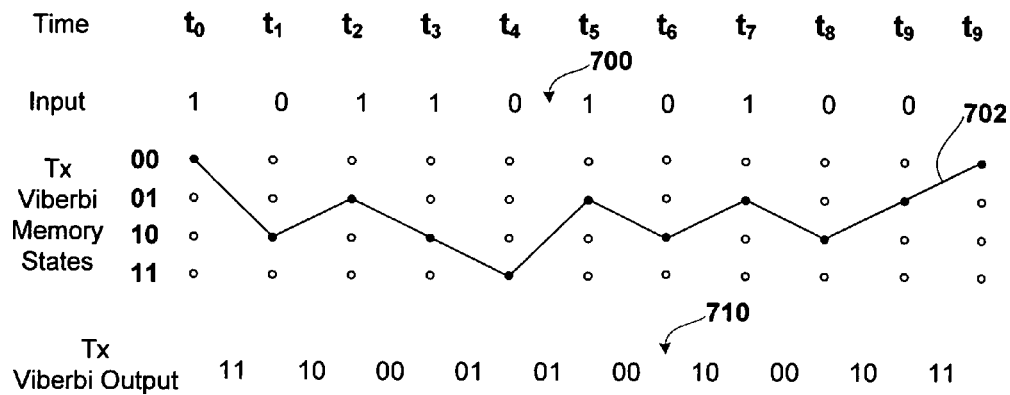
FIG. 7A     Trellis / Convolutional Encoding
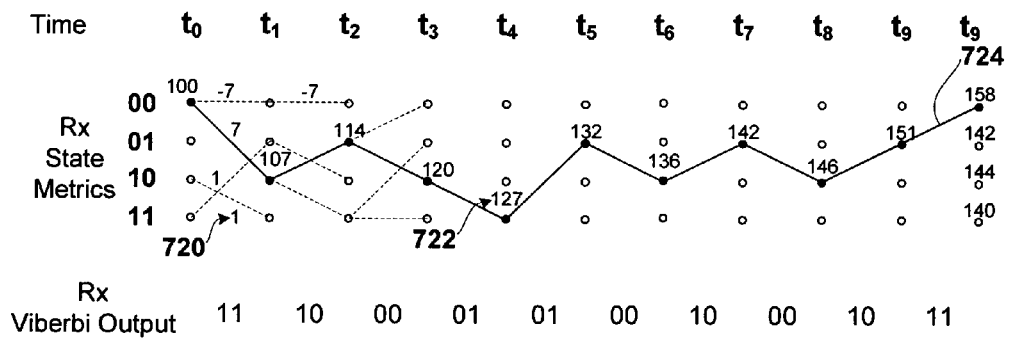
FIG. 7B     Decoding
FIG. 7C     Windowed Decoding
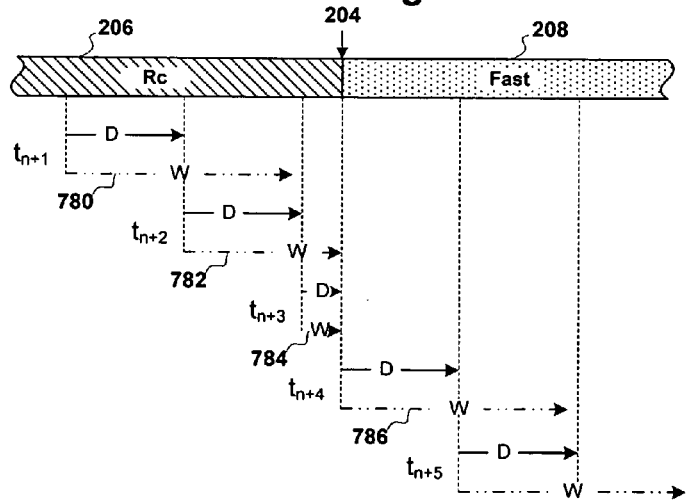

METHOD AND APPARATUS FOR FORWARD ERROR CORRECTION

CROSS REFERENCE TO RELATED APPLICATION

This application claims the benefit of prior filed co-pending Provisional Applications No. 61/227,869 filed on Jul. 23, 2009 entitled "Viterbi Decoding of REOC Tones in DSL" which is incorporated herein by reference in its entirety as if fully set forth herein.

BACKGROUND OF THE INVENTION

1. Field of Invention

The field of the present invention relates in general to modems and more particularly forward error correction of a convolutional type in digital modems.

2. Description of the Related Art

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. Subscriber lines were originally constructed to handle voice traffic in the narrow band between 300 Hz to 3000 Hz at bandwidths equivalent to several kilo baud. With X-DSL significant increases in bandwidth have been made possible by utilizing frequencies higher than the voice band to deliver services such as: data, video, audio etc. Thus an X-DSL modem may operate simultaneously with a voice band modem or a telephone conversation.

Currently there are over ten XDSL standards, including: G.Lite, ADSL, VDSL, SDSL, MDSL, RADSL, HDSL, etc. Within each standard there may be more than one line code, or modulation protocol, e.g. discrete multi-tone (DMT) and carrier less AM/PM (CAP). DMT modulation involves establishing a communication channel with a plurality of sub-channels each with a center frequency a.k.a. carrier tone. The sub-channels are frequency division multiplexed across the available bandwidth. Each sub-channel uses quadrature phase amplitude modulation (QPAM) to modulate information. The center frequency, a.k.a. tone of each sub-channel serves as the carrier on which QPAM modulation of information is effected. The information modulated on a tone is identified in the frequency domain as a sub-symbol which defines a unique phase and amplitude relationship between the carrier tone and the information modulated on it. Each sub-symbol may be expressed as a complex number. Specific bits of information are converted to a corresponding complex number using a mapping table, which defines for all possible phase and amplitudes supported by the DMT protocol corresponding binary bits. Collectively all the sub-symbols modulated on each tone across a tone set are defined as a symbol, with the symbol rate defined by the corresponding X-DSL standard.

After initialization the modems enter show time phase of operation in which high speed communication of voice, data and video takes place in the allocated upstream and downstream frequency bands over the subscriber line.

XDSL communications over a wired or wireless communication medium are typically impaired by noise within the transmission bandwidth. Transmit power is typically limited by practical considerations and the transmit signal is attenuated by path loss, multi-path distortions, and various forms of cross-talk. Typically a digital communication system is designed for the worst case signal quality at which the receiver is to operate. This signal quality is measured as an energy to noise ratio and is determined by the transmit power, path loss, noise and interference. The minimum energy at which data communications may be reliably received is the system threshold level. At the threshold level the probability of error for any digital transmission modulation protocol can be calculated. To reduce the error in signal transmission the digital data is encoded before transmission and decoded at the receiver. The coding technique is determined by the requirements of the application and the channel characteristics. Coding allows for detection and correction of errors in the transmitted data at the expense of additional processing overhead and or a lower effective data rate. Two classes of coding, block and convolutional coding are utilized to decrease the probability for error. Reed-Solomon and Viterbi are common forms of block and convolutional coding respectively.

A convolutional encoder encodes each input bit into code bits according to a set of generator polynomials. Each generator polynomial computes one code bit and the code bits are combined into a code branch. The constraint length, a.k.a. the maximul memory order, "m" of the encoder is the number of data bits used in the encoding process and determines the error correcting capability of the code. Long constraint lengths yield better performance at the expense of hardware and computational complexity. A state is designated by the $m-1$ prior input bits and there are $2^{m-1}$ states. A Viterbi algorithm is typically used to decode the transmitted code branches at the receiver. A Viterbi algorithm performs the maximum likelihood decoding of the transmitted data path. For each received code branch, the branch metric of all branches entering each state is computed and added to the corresponding prior path metrics and the best path entering each state is selected and stored as the new path metrics. Each Viterbi decoded bit is obtained by tracing a path back through the various path metrics to find the maximum likelihood path.

FEC techniques and in particular convolution encoding/decoding can be applied across a range of wired and wireless modulation protocols including: discrete multi-tone (DMT), carrierless AM/PM (CAP), quadrature amplitude modulation (QAM), quadrature phase amplitude modulation (QPAM), code division multiple access (CDMA), binary shift keying (BPSK), quaternary phase shift keying (QPSK), etc.

What is needed are computationally efficient methods and apparatus for reducing the complexity and increasing the throughput of convolutional encoders.

SUMMARY OF THE INVENTION

The present invention provides a method and apparatus for forward error correction in XDSL transceivers. In an embodiment a multi-tone transceiver with a plurality of components forming a transmit path and a receive path configured to couple via a subscriber line to an opposing multi-tone transceiver for frequency division multiplexed multi-tone modulated communications therewith is disclosed. The multi-tone transceiver comprises a noise margin channel identifier and a Viterbi decoder. The noise margin channel identifier on the receive path is configured to identify within a received tone set, discrete tones each associated with a corresponding one of at least two channels differing from one another in a relative noise margin of associated tones. The Viterbi decoder on the receive path is coupled to the noise margin identifier and responsive to the channel identification provided by the noise margin channel identifier to discretely decode each of the at least two channels; thereby improving the fidelity of the error correction provided by the Viterbi decoder by discretely processing the identified channels within the received set of tones.

In another embodiment of the invention the multi-tone transceiver comprises a trellis encoder on the transmit path to trellis encode in each successive symbol interval transmitted data from at least two channels and to terminate the trellis in an identifiable state at a tone boundary between the at least two channels, whereby at least one intermediate termination is introduced into the trellis in each symbol interval.

Associated methods and means are also claimed.

BRIEF DESCRIPTION OF THE DRAWINGS

These and other features and advantages of the present invention will become more apparent to those skilled in the art from the following detailed description in conjunction with the appended drawings in which:

FIGS. 7A-7B show representative transmit and receive side trellis and state metrics respectively for the FEC encoding in accordance with an embodiment of the current invention.

FIG. 7C shows a memory saving block decoding process, a.k.a. windowing, in accordance with an embodiment of the invention.

DETAILED DESCRIPTION OF THE EMBODIMENTS

A method and apparatus for a multi-tone transceiver offering improved FEC decoding by customizing the decoding process to correspond with identified noise margins established for each tone or sub-channel modulated by the transceiver. The transceiver which may be embodied physically in a plurality of transmit and receive path components or logically in a central Office DSL modem pool comprising a plurality of XDSL line cards for example.

The line cards support communication channels with differing degrees of robustness for multi-tone protocols including: asymmetric digital subscriber line (ADSL); very high bit rate digital subscriber line (VDSL) and other orthogonal frequency division multiplexing (OFDM) band plans including but not limited to the following:

TABLE 1

| Standard name | Common name | Downstream rate | Upstream rate |
|---|---|---|---|
| ANSI T1.413-1998 Issue 2 | ADSL | 8 Mbit/s | 1.0 Mbit/s |
| ITU G.992.1 | ADSL (G.DMT) | 8 Mbit/s | 1.0 Mbit/s |
| ITU G.992.1 Annex A | ADSL over POTS | 8 Mbit/s | 1.0 MBit/s |
| ITU G.992.1 Annex B | ADSL over ISDN | 8 Mbit/s | 1.0 MBit/s |
| ITU G.992.2 | ADSL Lite (G. Lite) | 1.5 Mbit/s | 0.5 Mbit/s |
| ITU G.992.3/4 | ADSL2 | 12 Mbit/s | 1.0 Mbit/s |
| ITU G.992.3/4 Annex J | ADSL2 | 12 Mbit/s | 3.5 Mbit/s |
| ITU G.992.3/4 Annex L | RE-ADSL2 | 5 Mbit/s | 0.8 Mbit/s |
| ITU G.992.5 | ADSL2+ | 24 Mbit/s | 1.0 Mbit/s |
| ITU G.992.5 Annex L[1] | RE-ADSL2+ | 24 Mbit/s | 1.0 Mbit/s |
| ITU G.992.5 Annex M | ADSL2+M | 24 Mbit/s | 3.5 Mbit/s |
| ITU G.993.1 | VDSL | | |
| ITU G.993.2 | VDSL 2 | | |

Figure 1:
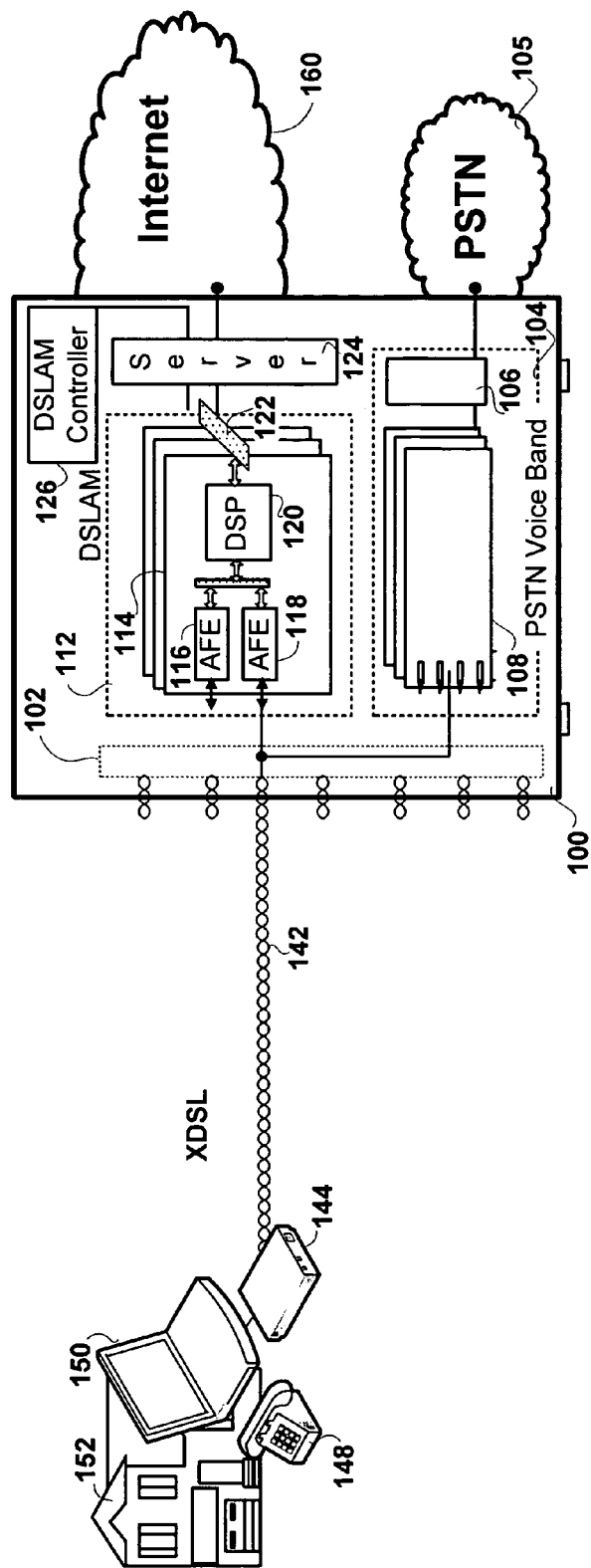
FIG. 1 shows a communication system with a logical modem at a central office (CO) coupled over a subscriber line to a physical modem at a customer's premises.

FIG. 1 shows a communication system with a logical modem at a central office (CO) 100 coupled over a subscriber line 142 to a physical modem 144 at a customer's premises (CPE) 152. At the customer premises the physical modem is shown coupled voice band communications with the phone 148 and X-DSL broadband communications with the notebook computer terminal 150.

All subscriber lines handled by the CO originate in the frame room 102 of the CO. From this room connections are made for each subscriber line via splitters and hybrids to both a digital subscriber line access module (DSLAM) 112 and to the voice band racks 104. The splitter 102 shunts voice band communications to dedicated line cards, e.g. line card 108 or to a voice band modem pool (not shown). The splitter shunts higher frequency X-DSL communications on the subscriber line to a selected line card, e.g. line card 114, within DSLAM 112. Voice band call set up is controlled by a Telco switch matrix 106 such as SS7. This makes point-to-point connections to other subscribers for voice band communications across the public switched telephone network 105. The X-DSL communications may be processed by a universal line card such as line card 114. That line card implements a plurality of logical modems via a digital signal processor (DSP) 120 coupled across a packet bus with a number of analog front ends (AFE) of which AFEs 116, 128 are referenced. Each AFE couples via a hybrid front end (HFE) with a corresponding one of the subscriber lines. For downstream communications from the CO to the remote site, the DSP modulates the data for each communication channel, the AFE transforms the digital symbol packets assembled by the DSP and converts them to an analog signal which is output on the subscriber line associated with the respective channel. For upstream communications from the remote site to the CO the AFE converts the communications to digitized data samples which are sent to the DSP where they are demodulated. The DSP may be capable of multi-protocol support for all subscriber lines to which the AFE's are coupled. Communication between AFE(s) and DSP(s) may be packet based. The line card 114 is coupled via a back-plane bus 122 to the Internet 160 via server 124. Each of the DSLAM line cards operates under the control of a DSLAM controller 126 which handles global provisioning, e.g. allocation of subscriber lines to AFE and DSP resources. The various components on the line card form a plurality of logical modems each handling upstream and downstream communications across corresponding subscriber lines. When an X-DSL communication is established on a subscriber line, a specific channel identifier is allocated to that communication. That identifier may be used in the above mentioned packet based embodiment to track each packet as it moves in an upstream or downstream direction between the AFE and DSP.

Figure 2A:
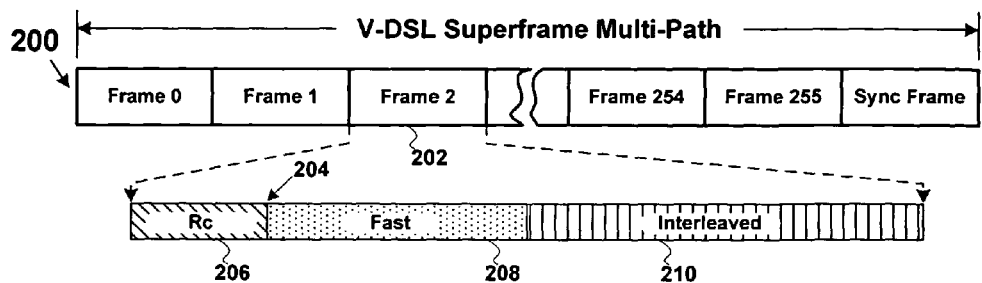
FIG. 2A is a data structure diagram of a representative VDSL superframe.

FIG. 2A is a data structure diagram showing a representative VDSL superframe 200 comprising 256 frames plus a synch frame. Each frame, e.g. frame 202, corresponds with a symbol or tone set. Each frame is transmitted or received in one symbol interval. In the example shown the frame 202 comprises fast and interleaved data portions 208, 210 respectively. In an embodiment of the invention a portion of the fast path is shown as having what is identified in this invention as a robust communication channel (RCC) 206. The robustness arises from the combination of bit loading and signal to noise ratios for the associated tones, the resultant noise margin for which are uniform within the tones associated with the channel and have a higher noise margin than the remaining portions of the tone set. In this embodiment of the invention there are two noise margin channels the first of which is the robust communication channel (RCC) and the second of which, a.k.a. the standard communication channel (SCC) comprises the remaining tones of the fast and the interleaved portions of the frame. The boundary 204 between these two channels is shown. In alternate embodiments of the invention there may be more than two noise margin channels each comprising one or more tones. In still another embodiment of the invention the tones associated with a given noise margin channel may not be contiguous with one another, rather they may be interlaced throughout the tone set with tones associated with other noise margin channels.

Figure 2B:
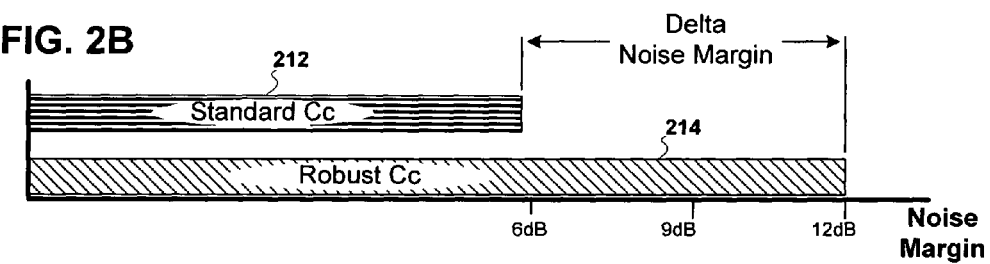
FIG. 2B is a graph showing the representative noise margin difference between two different noise margin channels supported by the physical and logical modems shown in FIG. 1.

FIG. 2B a graph showing a representative difference in noise margin between the SCC 212 and the RCC 214.

Figure 2C:
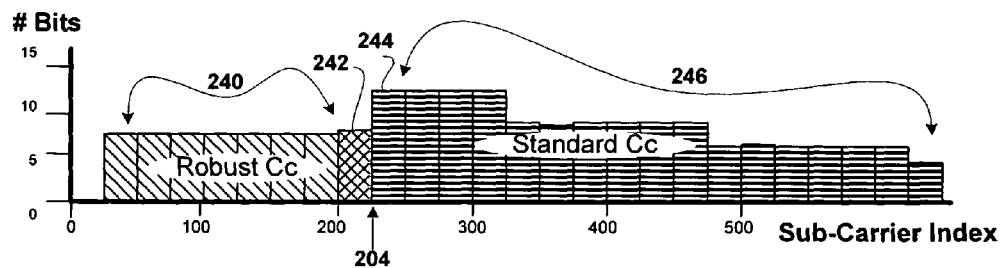
FIGS. 2C-2D are graphs of bit loading versus tone or sub-carrier index for the tones within each tone set or symbol associated with the noise margin channels shown in FIG. 2B.
Figure 2D:
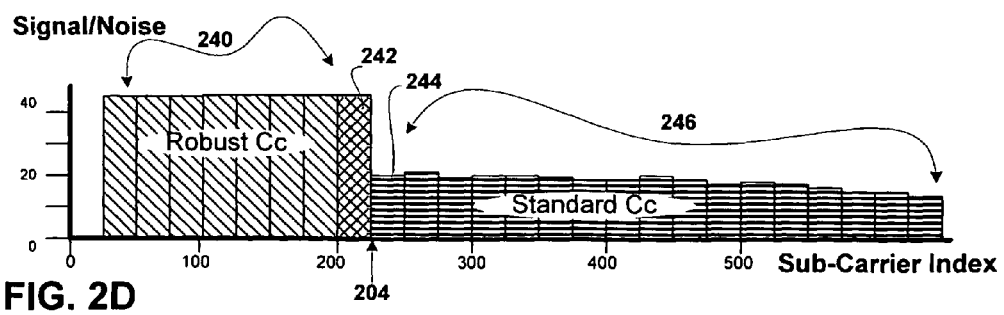

FIGS. 2C-2D show examples of the per tone bit loading and signal to noise ratio (SNR) for the robust and standard communication channels shown in FIG. 2B. The tones 240 associated with the RCC and the SCC 246 are shown. In an embodiment of the invention the constellation encoder and specifically a trellis terminator subcomponent thereof (See FIG. 3) injects termination bits within identified tones 242 and 244 at the boundary between the end of the RCC and the start of the SCC. The injection of one or more termination bits at the tone boundaries between noise margin channels results in one or more intermediate trellis terminations in the trellis generated in each symbol interval for each corresponding tone set.

Figure 3:
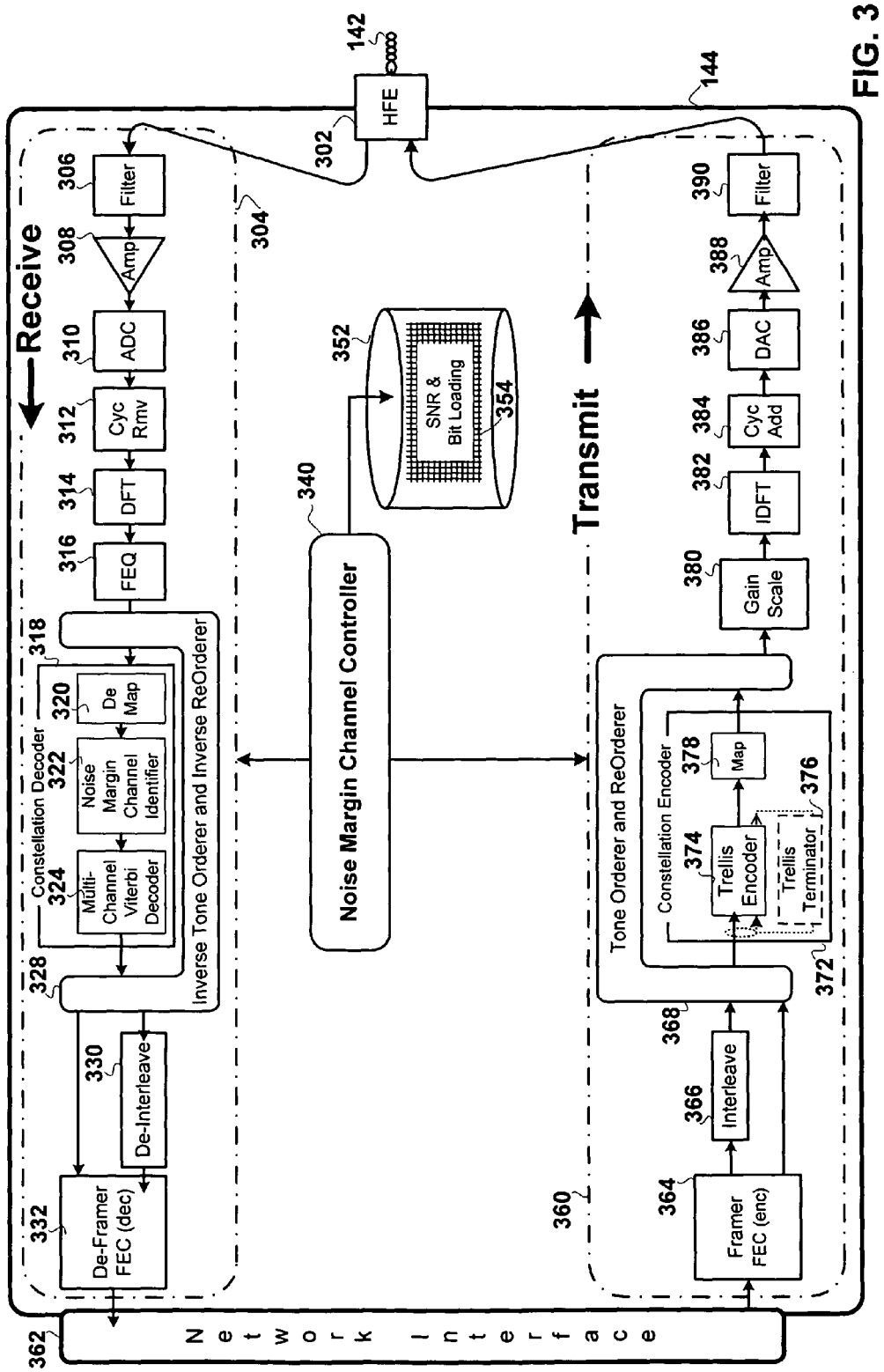
FIG. 3 is a detailed hardware block of one of the modems shown in FIG. 1 in accordance with an embodiment of the invention.

FIG. 3 is a detailed hardware block of one of the modems shown in FIG. 1 in accordance with an embodiment of the invention. The modem, a.k.a. transceiver, includes a plurality of shared and discrete components coupled to one another to form a transmit path 360 and the receive path 304 as well as a noise margin channel controller 340 and memory 352. The transmit and receive paths couple at one end to a network on one end via network interface 362 and to a subscriber line 142 at the other end.

The noise margin channel controller 340 couples to the components of the transmit and receive path as well as to memory 352. In an embodiment of the invention the noise margin channel controller uses per tone signal to noise ratios and bit loading to set noise margins in each tone, and collectively to define two or more subsets of tones in each tone set which are distinguishable from one another on the basis of the assigned noise margin. Each subset is identified as a noise margin channel. The most robust channel, i.e. one with highest assigned noise margin may be used to transport critical control information between modems.

The noise margin channel controller utilizes the per tone bit loading tables and signal-to-noise (SNR) histories 354 for each tone to initiate and maintain two or more noise margin channels distinguishable from one another in the noise margins associate with the corresponding tones allocated to each channel within each tone set. The noise margin channel controller 340 determines which tones will be assigned to which noise margin channels. Channels with higher noise margins may be identified as robust communication channels. These assignments may in an embodiment of the invention be made during channel initialization. In another embodiment of the invention they are made during showtime phase of operation as well.

The transmit path 360 includes a framer 364 for framing incoming data. 'Fast Path' data is sent directly to the tone orderer and re orderer 368 for ordering and reordering. Data designated for interleaving is sent first to the interleaver before tone ordering. Interleaving reduces the effect of impulse noise by distributing adjacent bytes across a transmission interval greater than the expected impulse noise intervals. Next in the constellation encoder 372 the data bits in each tone or sub-channel are converted by the constellation encoder 374 and specifically the mapper component 378 thereof into a corresponding complex value number representative of a combination of phase and amplitude for the bits in the associated constellation as identified in the bit allocation table received from the opposing modem.

In an embodiment of the invention the constellation encoder includes a forward error correction (FEC) capability, e.g. Trellis or convolutional encoding. Encoding is performed by the trellis encoder 374. In still another embodiment of the invention a trellis terminator component 376 is coupled to the trellis encoder. The trellis terminator injects one or more intermediate trellis terminations along the trellis generated in each symbol interval at locations in the bit stream corresponding with the boundary(s) between different noise margin channels.

After constellation encoding each tone is gain scaled in the gain scaler 380. A transformation from the frequency to the time domain is then performed on all the tones or sub-channels in each symbol interval by the inverse discrete Fourier transform (IDFT) module 382. The resultant symbol is subject to any required cyclic extension, e.g. prefix or suffix, in the cyclic adder 384. After any required up conversion a digital-to-analog (DAC) conversion is performed in DAC 384. The output of the DAC is amplified in amplifier 388 and filtered in filter 390 before passing to the subscriber line 142 via the HFE 302.

The receive path 304 couples to subscriber line 142 via the hybrid front end 302. The received analog signal is subject to analog filtration in filter 306 and amplification in amplifier 308. The received analog signal is converted to a digital signal in analog-to-digital converter 310. Then after any required down-conversion is digitally performed, cyclic prefixes or suffixes are removed in the cyclic removal module 312. Next the received digital signal is transformed from the time to the frequency domain in a discrete Fourier transform module 314 and each resultant set of tones is subject to frequency domain equalization (FEQ) in the FEQ 316. This latter process normalizes frequency dependent signal gain variations in the received tones. The complex number corresponding to the phase and amplitude on each sub-channel or tone is then decoded into corresponding bits in the constellation decoder 318.

In an embodiment of the invention the constellation decoder includes a Viterbi decoding capability. In this embodiment of the invention the constellation decoder also has means for identifying channels within the received tone set distinguishable from one another on the basis of noise margin associated therewith, a.k.a. 'noise margin channels' and for handling the decoding for each channel differently.

The constellation decoder includes a demapper 320, a noise margin channel identifier 322 and a multi-channel Viterbi decoder 324.

Then, in the inverse tone orderer and inverse tone reorderer 328 the tones are reordered. The reordered tones associated with the 'fast path' i.e. low latency path are sent directly to the de-framer 332. Tones associated with the 'interleaved path' are sent via the deinterleaver 330 to the de-framer 332 as well.

Figure 4:
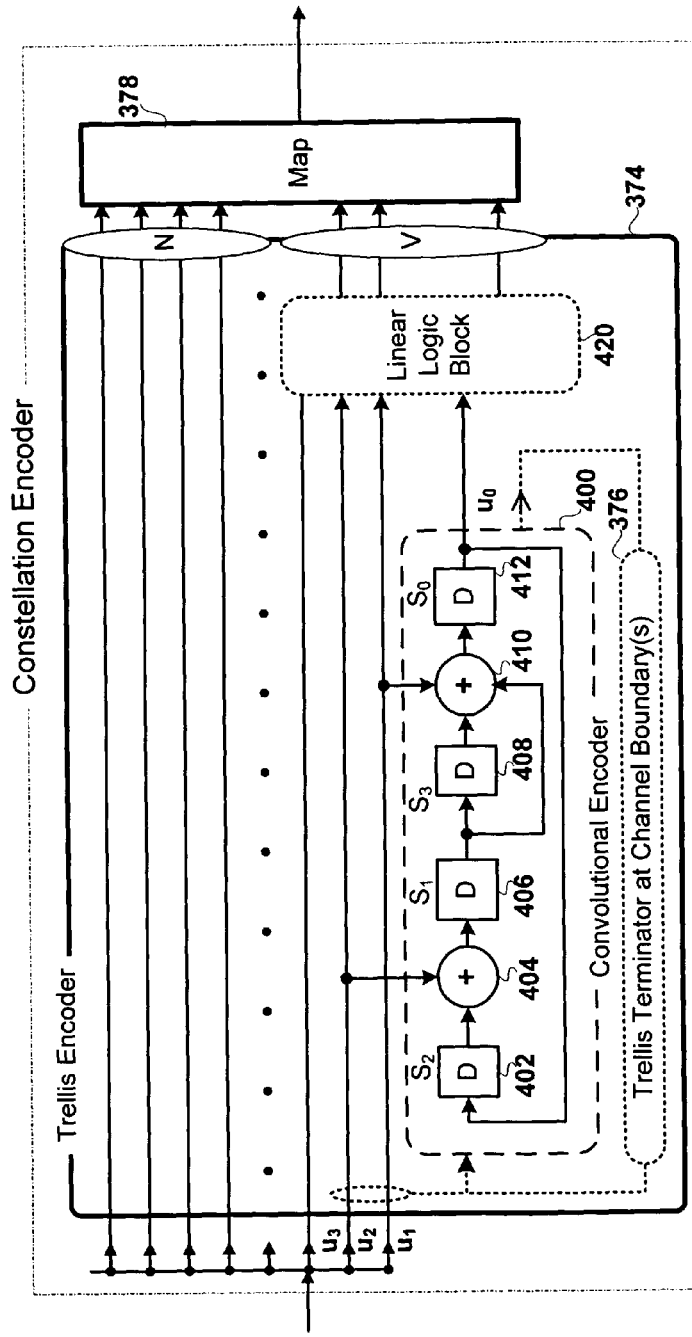
FIG. 4 is a detailed hardware block diagram of an embodiment of the constellation encoder shown in FIG. 3.

FIG. 4 is a detailed hardware block diagram of a constellation encoder 378 on the transmit path for mapping input bits some of which are trellis encoded into a corresponding point in the constellation associated with the range of phase and amplitude combinations supported by the modem. The constellation encoder includes a mapper 378 and a trellis encoder. The trellis encoder outputs a bit stream to the mapper comprising bits "N" which are not trellis/convolutionally encoded and other bits "V" which are convolutionally encoded. Convolutional encoding is accomplished with linear logic block 420 which accepts inputs from a convolutional encoder 400. The convolutional encoder in this example has 4 memories 402, 406, 408 and 412 coupled serially to one another with two exclusive or "XOR" elements 404, 410. In an embodiment of the invention the trellis terminator 376 coupled to the convolutional encoder introduces intermediate terminations in the trellis generated by the encoder at the boundary between different noise margin channels. The termination may be accomplished by driving the trellis to either a known state at the start and end of a corresponding noise margin channel, e.g. zero bits associated with termination or truncation, or to a symmetrical state e.g. tail or start bits a.k.a. tailbiting.

Figure 5:
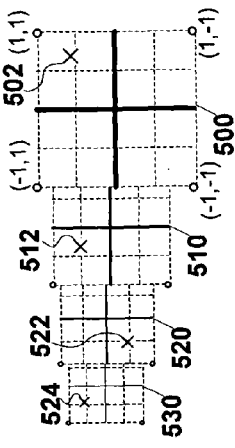
FIG. 5 shows four successive constellation maps.

FIG. 5 shows four successive constellation maps 500, 510, 520, 530 each including a corresponding received symbol point 502, 512, 522, 524 respectively. The dependence across time of the convolutionally encoded portion of the transmitted and mapped bit stream is used by the receiver's Viterbi decoder to more faithfully determine which point on the constellation map shared by the modems each received sub-symbol, a.k.a. sub-channel, a.k.a. tone represents.

Figure 6:
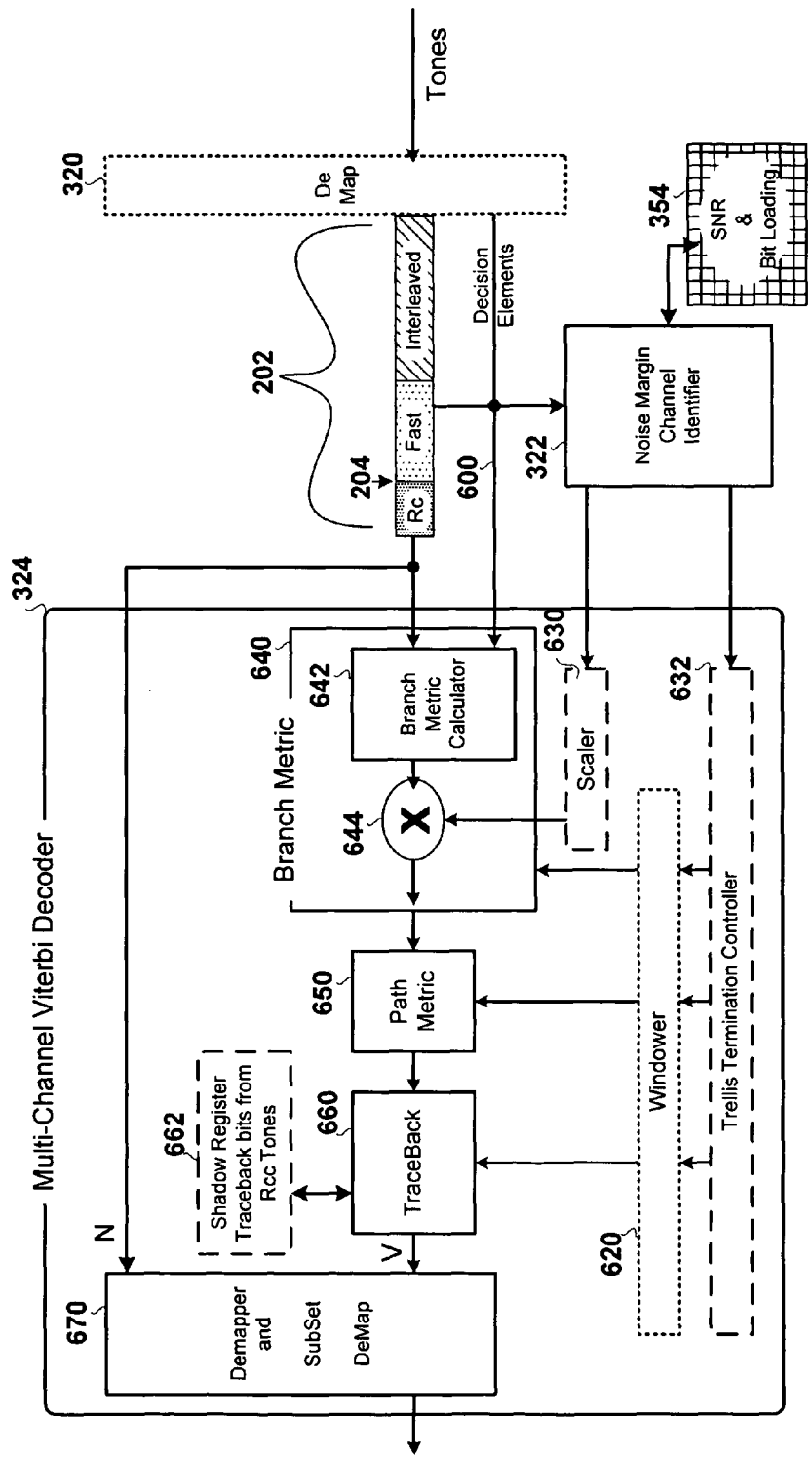
FIG. 6 is a detailed hardware block diagram of an embodiment of the constellation decoder shown in FIG. 3.

FIG. 6 is a detailed hardware block diagram of the constellation decoder 318 in accordance with an embodiment of the invention as shown in FIG. 3. The constellation decoder includes the noise margin channel identifier 322 and the multi-channel Viterbi decoder 324. In an embodiment of the invention it may also include demapper 320. Each received tone set, e.g. tone set 202 is provided to the multi-channel Viterbi decoder along with decision elements 600, e.g. 'soft' or 'hard' tones or bits.

The noise margin channel identifier, identifies channels exhibiting different noise margins within the received symbol 202, a.k.a. tone set. Within the tone set 202 are shown the fast path portion and interleaved path portions of a typical VDSL communication. In an embodiment of the invention, a portion of the fast path is shown as having what is identified in this invention as a robust communication channel. The robustness arises from the combination of bit loading and signal to noise ratios for the associated tones, the resultant noise margin for which are uniform within the tones associated with the channel and have a higher noise margin than the remaining portions of the tone set. The remaining tones or sub-channels of the fast and interleaved portions of the frame or tone set all correspond with tones which have a largely uniform and lower noise margin than the tones associated with the robust communication channel. In this embodiment of the invention there are two noise margin channels the first of which is the robust communication channel and the second of which are the remaining tones of the fast and interleaved portions of the frame. The boundary 204 between these two channels is shown. In alternate embodiments of the invention there may be more than two noise margin channels each comprising one or more tones. In still another embodiment of the invention the tones associated with a given noise margin channel may not be contiguous with one another, rather they may be interlaced throughout the tone set with tones associated with other noise margin channels.

The identification of noise margin channels is handled by the noise margin channel identifier 322. The identification performed thereby allows for improved decoding of the received tone set. Noise margin channels may be identified exclusively by the noise margin channel identifier of the receiving modem or cooperatively between the transmitting and receiving ones of a modem pair coupled to opposing ends of a subscriber line. Noise margin channels may also be identified statically during the initialization phase of the modems' operation or dynamically throughout a session. Cooperative identification may be accomplished via message exchange between opposing modems with the messages identifying channel boundaries and or noise margins associated with the noise margin channels. An example of single sided identification of noise margin channels is the calculation by the noise margin channel identifier of relative noise margins among the received tones of one or more tone sets. This may be accomplished using session data from the bit loading table and signal to noise ratio table 354. Alternately, the noise margin channel identifier may rely on trellis terminations at the start and end of each sub-set of tones associated with a given noise margin channel to identify the boundaries between channels and hence the channels themselves.

Decoding commences in the multi-channel Viterbi decoder 324 once the presence of noise margin channels is ascertained and the corresponding boundaries thereof are identified. Decoding may involve either or both scaling of branch metrics to correspond with the relative noise margin for a given noise margin channel and/or discrete decoding of the tones associated with a given channel without overlap in the decoding process with tones associated with other noise margin channels.

Scaled decoding of noise margin channels is initiated by the scaler 630. The scaler is coupled to the branch metric module the sub-components of which are the metric calculator 642 and scaler, e.g. multiplier 644. The scaler determines for a given noise margin channel identified by the noise margin channel identifier, the appropriate scaling factor for the elementary tone metrics forming the branch metrics thereof.

Branch metric computation in this embodiment of the invention is handled by the branch metric calculator which calculates elementary branch metrics for each tone of the trellis encoded tone set 202. A branch metric is then formed by the combination of the elementary tone metrics. In VDSL a branch metric is determined between each possible state associated with successive discrete tone pairs within the received tone set. The branch metrics along with the known states of the trellis allow the metric calculator to calculate weighting coefficients for each possible path in the trellis.

The metrics provided by the metric calculator 642 are scaled by the attached multiplier in an amount determined by the scaler. In an embodiment of the invention where the relative noise margins between channels differ by powers of "2", or can be rounded to powers of "2", the scaler can be implemented with a binary left/right shift register.

The scaled metrics are used by the path metric sub-component 650 to determine an optimal incoming path for each state. In an embodiment of the invention, implementing VDSL multiple tone metrics are converted into one branch metric. Next, in the traceback sub-component an optimal path back through the states processed by the path metric sub-component is determined. The optimal path obtained after traceback maps in a VDSL embodiment of the invention to what is known as an optimal 'cosec'. In VDSL a coset is the subset of the signal set used to map trellis coded bits to a tone.

The resultant decoded "V" bits, a.k.a. cosets are sent to the demapper and subset demapper 670 for demapping in combination with any unencoded portion of the received signal, which in the case of a VDSL embodiment corresponds to the "N" bits shown in FIG. 4. The resultant demapped bits are then subject to further receive path processing.

Discrete decoding of the tones associated with a given noise margin channel without overlap in the decoding process with tones associated with other noise margin channels is initiated by the trellis termination controller 632. The trellis termination controller uses the noise margin boundary identification provided the noise margin channel identifier 322 to control the various Viterbi decoding sub-components, e.g. the branch metric, path metric, traceback sub-components so as to avoid overlapping the decoding of different noise margin channels. All branch, path and traceback processing is completed within the confines of the subset of tones associated with a given noise margin channel before initiating decode processing of the next noise margin channel and the tones associated therewith.

For either the scaled or discrete decoding embodiments of the invention a process known as 'windowing' may be utilized to reduce memory size required for the decoding process. If the length of the path metric and traceback is limited to a length less than that of the tone set, then windowing can be used. Windowing refers to the decoding of blocks of tones rather than the entire tone set. Windowing is controlled by the windower 620 and can be used with equal advantage in conjunction with either the scaled or discrete embodiments of the invention.

Where windowing is used with discrete decoding the trellis termination controller reduces the length of the final window of decoding in a given noise margin channel to coincide with the tone boundary of the noise margin channel, thus avoiding overlap in the decoding of one channel with the tones of another.

In a legacy environment in which the windower traverses the entire tone set, decoding may still be accomplished without overlap, with the use of one or more shadow registers 662 to hold the traceback or other metrics associated with a given noise margin channel during the windowed decoding.

FIG. 7A shows a simplified trellis and associated branch and path metrics for a trellis associated with a 2 state memory convolutional encoder. Input bits 700 are convolutionally, a.k.a. trellis encoded. As each successive input bit is input to the trellis encoder the memory states in the encoder take on the values shown in path 702. The corresponding output bits 710 from the encoder are shown.

FIG. 7B shows corresponding representative receive side state metrics associated with Viterbi decoding of the convolutionally encoded input discussed above in connection with FIG. 7A. The branch metrics, e.g. branch metric 720, are shown, along with representative path metrics, e.g. path metric 722. The highest probability traceback path 724 is determined on the basis of comparative cost of each survivor path.

FIG. 7C shows a memory saving block decoding process, a.k.a. windowing in accordance with an embodiment of the invention in which the discrete Viterbi decoding on a per noise margin channel basis is implemented. A sliding window "W" normally spanning a uniform number of tones is shown at successive time instances $t_{n+1}$ to $t_{n+5}$. As the sliding window approaches the boundary 204 between different noise margin channels 206 and 208 the length of the windows 782 and 784 are attenuated so as not to overlap with the decoding of the next noise margin channel. After passing the boundary, the next window 786 at the start of the next noise margin channel to be decoded returns to the normal size. The control of window size is handled by the trellis termination controller 326 discussed above in connection with FIG. 6.

Figure 8:
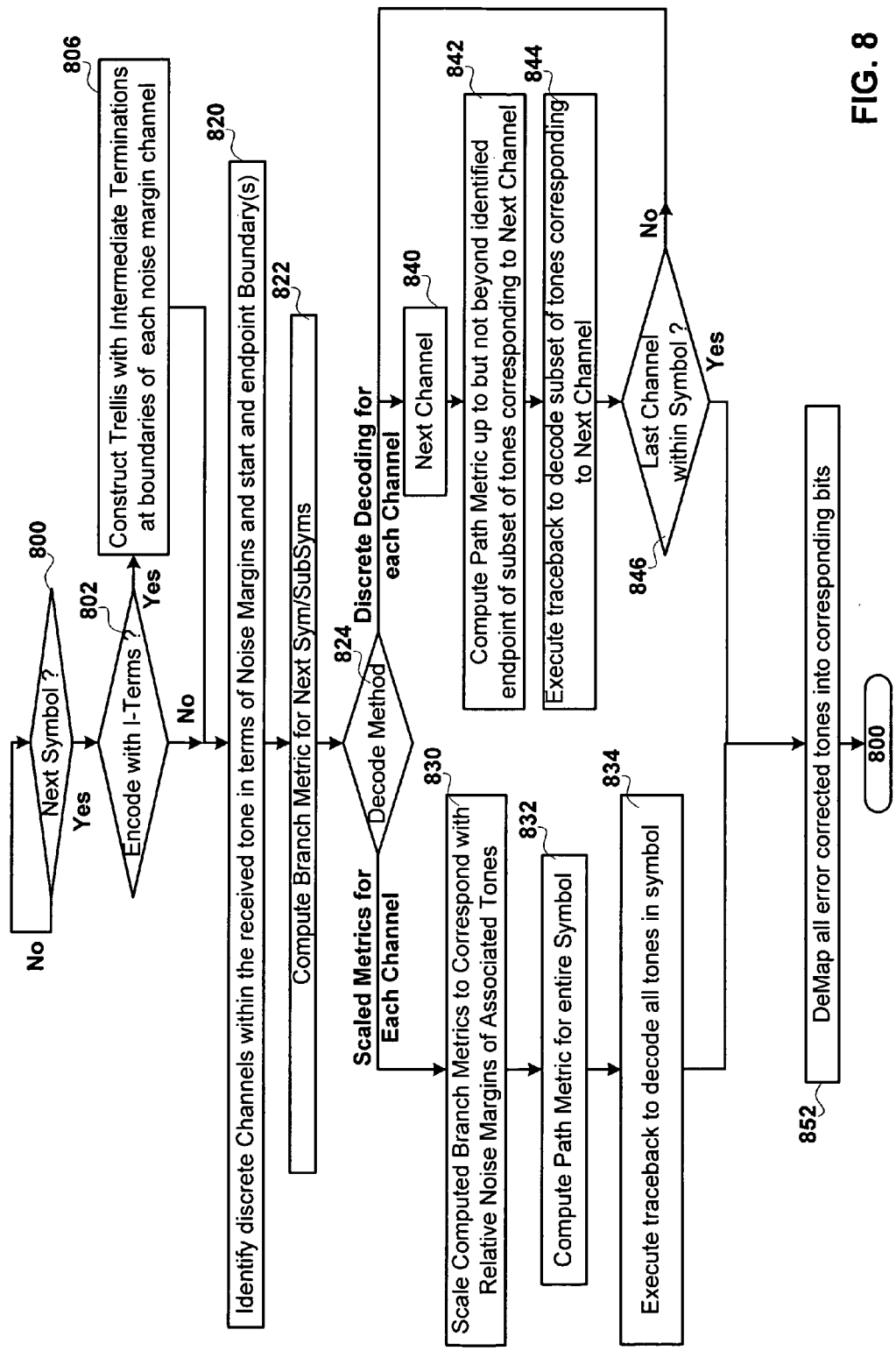
FIG. 8 is a process flow diagram of transceiver operations associated with forward error correction in accordance with several embodiments of the invention.

FIG. 8 is a process flow diagram of transceiver operations associated with forward error correction in accordance with several embodiments of the invention. The processes shown can be performed singly or in combination on either or both of an opposing pair of transceivers coupled to a subscriber line.

Processing begins with decision process 800 in which a determination is made as to whether the next symbol and associated set of tones has been received for processing. If it has then processing passes to decision process 802.

Decision process 802 is the first of the transmit path trellis encoding processes. In an embodiment of the invention process 802 includes a determination as to trellis encoding method, specifically whether or not there will be any intermediate terminations added along the trellis which coincide with boundaries between noise margin channels. To improve the fidelity of trellis decoding the trellis encoding may, in an embodiment of the invention, include one or more intermediate terminations along the length of the trellis constructed by the trellis encoder from the input bit stream at the one or more boundaries between channels distinguishable on the basis of the relative noise margins of the tones associated with each channel. This determination is made in decision process 802.

If an affirmative determination is made in decision process 802 that there will be intermediate terminations introduced into the trellis at noise channel boundaries then control passes to process 806. Intermediate trellis termination may involve many forms of trellis termination applied at the level of an individual noise margin channel. This may involve the injection of extra bits between the trellis encoded bits associated with a tone at the end of one noise margin channel and the tone at the beginning of the next noise margin channel, a.k.a. a noise margin channel boundary. In an embodiment of the invention these intermediate terminations may involve intermediate trellis truncation at noise channel boundaries. In this embodiment of the invention the convolutional encoder's memory(s) are set to a known state e.g. 'zero' at the start boundary of the tones associated with the start of each noise margin channel. In another embodiment of the invention in a process alternately known as trellis termination the trellis may be set to a known state, e.g. 'zero' at both the start and the end of the bits associated with each successive noise margin channel. Alternately in a termination process known as tail biting data bits from the start of a noise margin channel are used to terminate the channel or vice versa. Again either approach effects intermediate termination of the trellis at each noise margin channel boundary along the length of the trellis generated by the convolutional/trellis encoder. Alternately, if a negative determination is reached in decision process 802 then no intermediate terminations are introduced at noise channel boundaries along the trellis.

Process 820 is the first of the receive path processes associated with Viterbi decoding the noise margin channels identifiable within each received tone set. In process 820 the identification of discrete noise margin channels within the received tones of each tone set is effected. This identification may include either or both the relative noise margins between each channel and or the boundaries, e.g. start and end tone(s)

associated with each channel. In some embodiments of the invention a single noise margin channel may be associated with many non-contiguous tones interlaced with tones of other noise margin channels throughout each received tone set. In which case there will be multiple boundaries for each channel.

Noise margin channels may, in alternative embodiments of the invention, be identified exclusively by the receiving modem, or cooperatively between the transmitting and receiving ones of the modem pair coupled to one another via a subscriber line. Further, noise margin channels may, in still other embodiments of the invention be identified statically, during for example the initialization phase of the modems operation or dynamically throughout the session. An example of cooperative identification of the noise margin channels between the opposing modems includes the passing of a control, embedded, or seamless rate adaptation message between the transmitting and receiving modem which indicates channel boundaries and or noise margins associated with the noise margin channels. An example of single sided identification of noise margin channels is the calculation by the receiving modem of relative noise margins among the received tones of one or more tone sets using the bit loading table and signal to noise ratios for each tone and the identification of noise margin channels therefrom. Another example of single sided identification of noise margin channels is the determination by the noise margin identifier of trellis terminations throughout the received tone sets and the identification of noise margin channels therefrom.

After noise margin channels are identified the branch metrics for the symbol, a.k.a. tone set are determined in process 822. Then in decision process 824 a determination is made as to Viterbi decoding method.

The left or 'scaled metric' Viterbi decoding branch encompassing steps 830-834 involves the application of differential scale factors to the branch metrics of one channel versus another channel with the amount of scaling based on the relative noise margins of the associated tones. In process 830 computed branch metrics are scaled to correspond with the relative noise margins of the tones associated each channel. In process 832 the path metric is computed for the entire symbol, a.k.a. tone set. In process 834 a traceback is performed to determine correction factors for decoding and demapping all tones in the symbol. In a VDSL embodiment of the invention the traceback determines the decoded coset sequence that corresponds to the most likely coset sequence mapped to the transmitted tones in the symbol.

The right or 'discrete' Viterbi decoding branch encompassing steps 840-842 involves the application of discrete windowed or single pass decoding of each identified noise margin channel independently of one another, e.g. without overlap in any of the decoding processes. In process 840 the decoding begins at the bits associated with the first tone of the next channel. Then in process 842 the path metric is computed up to but not beyond the identified endpoint of the subset of tones corresponding to the next channel. In process 844 the traceback is executed to determine the correction factors for decoding the subset of tones corresponding to the next noise margin channel. In a VDSL embodiment of the invention, the traceback is executed to determine decoded coset sequence associated with the subset of tones corresponding to the next noise margin channel. Finally, in decision process 846, a determination is made as to whether the last noise margin channel has been processed and the end of the symbol reached. If it has, then control is passed to process 852. If it has not then control returns to process 840 for the processing of the tones associated with the next channel.

In an alternate embodiment of the invention either branch of the decoding processes may be effected via a sliding window with a length less than the length of the channel. In this embodiment of the invention discrete decoding in accordance with processes 840-846 is effected by attenuating or shortening the window length proximate each boundary so as to synchronize the path metric and traceback at each noise channel boundary thereby avoiding window overlap with tones associated with the next channel.

After either or both scaled or discrete decoding control is passed to process 852. In process 852 the demapping of each error corrected tone to corresponding bits is effected after which control returns to process 800 for the processing of the next set of tones within the next symbol interval.

The encoding and decoding steps discussed above may be practiced singly on the transmit path or the receive path or in combination on the transmit path together with the receive path. In still further embodiment of the invention the scaled metric steps 830-834 and the discrete decoding steps 840-846 on the receive path can be practiced in combination with one another rather than alternately.

The components and processes disclosed herein may be implemented as software, hardware, firmware, or a combination thereof, without departing from the scope of the Claimed invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A multi-tone transceiver with a plurality of components forming a transmit path and a receive path configured to couple via a subscriber line to an opposing multi-tone transceiver for frequency division multiplexed multi-tone modulated communications therewith; and the multi-tone transceiver comprising:

a hybrid front end that couples the receive path to the subscriber line;

a noise margin channel identifier component on the receive path configured to identify within a received tone set, discrete tones each associated with a corresponding one of at least two channels differing from one another in a relative noise margin of associated tones; and a Viterbi decoder component on the receive path coupled to the noise margin identifier component and responsive to the tone identification provided by the noise margin channel identifier component to discretely decode each of the corresponding at least two channels; thereby improving the fidelity of the error correction provided by the Viterbi decoder by discretely processing the identified tones within the received set of tones.

2. The multi-tone transceiver of claim 1 wherein the Viterbi decoder component further comprises:

a scaler sub-component for determining a discrete scale factor associated with each of the at least two channels identified by the noise margin identifier, and the scale factor for each channel based on an associated noise margin of the associated tones of the channel; and a branch metric sub-component responsive to the scale factor for each channel determined by the scaler sub-component to scale a branch metric for the discrete tones associated with each channel accordingly.

3. The multi-tone transceiver of claim 1 wherein the Viterbi decoder component further comprises:
- a branch metric sub-component to determine a branch metric between each possible state associated with successive discrete tones within the received tone set;
- a path metric sub-component coupled to the branch metric sub-component to determine an optimal incoming path for each state;
- a trace back sub-component to derive an optimal path back through the states processed by the path metric sub-component; and
- a trellis termination controller sub-component responsive to the identification provided by the noise margin identifier of discrete tones within the received tone set associated with each of the at least two channels, to configure the branch and path metric sub-components together with the trace back subcomponent to discretely decode each of the at least two sub-channels;
- thereby avoiding overlap in decoding of the at least two channels.

4. The multi-tone transceiver of claim 1 having the noise margin channel identifier further configured to identify the at least two channels by calculating noise margins of the received tone set based on per tone bit loading and per tone signal to noise ratios.

5. The multi-tone transceiver of claim 1 further comprising:
- a trellis encoder component on the transmit path to trellis encode in each successive symbol interval transmitted data from at least two channels differing from one another in a relative noise margin for associated tones and to terminate the trellis in an identifiable state at a tone boundary between the at least two channels, whereby at least one intermediate termination is introduced into the trellis in each symbol interval.

6. The multi-tone transceiver of claim 1 wherein the Viterbi decoder component further comprises:
- a metric calculator sub-component configured to determine a branch metric for a received set of tones;
- a scaler sub-component for determining a discrete scale factor for each tone among the received set of tones based on an associated noise margin of the associated channel; and
- a binary left/right shift register having a control input coupled to the scaler sub-component, an input coupled to the metric calculator sub-component and an output, and the binary left/right shift register scaling the branch metrics for the received set of tones determined by the metric calculator sub-component in binary increments determined by the discrete scale factors determined by the scaler sub-component by effecting a corresponding left or right shift of the branch metrics for the received set of tones determined by the metric calculator.

7. The multi-tone transceiver of claim 1 wherein the Viterbi decoder component further comprises:
- a branch metric sub-component to determine a branch metric between each possible state associated with successive discrete tones within the received tone set;
- a path metric sub-component coupled to the branch metric sub-component to determine an optimal incoming path for each state;
- a trace back sub-component to derive an optimal path back through the states processed by the path metric sub-component;
- a windower sub-component coupled to the branch, path, and trace back subcomponents for configuring same to decode the received tone set in windowed increments having a length less than the length of the tones associated with a channel; and
- a trellis termination controller sub-component coupled to the windower subcomponent and responsive to the identification provided by the noise margin identifier of discrete tones within the received tone set associated with each of the at least two channels, to configure the windower sub-component to discretely decode each of the at least two sub-channels including adjustment of the windowed increments to avoid overlap in decoding of the at least two channels.

8. A multi-tone transceiver with a plurality of components forming a transmit path and a receive path configured to couple via a subscriber line to an opposing multi-tone transceiver for frequency division multiplexed multi-tone modulated communications therewith; and the multi-tone transceiver comprising:
- a hybrid front end that couples the transmit path to the subscriber line;
- a trellis encoder component on the transmit path to trellis encode in each successive symbol interval transmitted data from at least two channels; and
- a trellis terminator component coupled to the trellis encoder component configured to terminate the trellis in an identifiable state at a tone boundary between the at least two channels, whereby at least one intermediate termination is introduced into the trellis in each symbol interval.

9. A method for frequency division multiplexed multi-tone modulated communications on a multi-tone transceiver configured to couple to a subscriber line; and the method comprising:
- identifying within a received tone set, discrete tones each associated with a corresponding one of at least two trellis encoded channels differing from one another in a relative noise margin of associated tones; and
- discretely decoding each of the at least two tones identified in the identifying act, thereby improving the fidelity of the error correction provided by the corresponding trellis encoded channels by discretely processing the identified tones within the received set of tones.

10. The method of claim 9, wherein the decoding act further comprises:
- determining for each of the at least two trellis encoded channels corresponding to the tones identified in the identifying act, a discrete scale factor for each channel based on an associated noise margin of the associated tones of the channel; and
- scaling a branch metric for the discrete tones associated with each channel based on the scale factor determined in the determining act.

11. The method of claim 9, wherein the decoding act further comprises:
- determining a branch metric between each possible state associated with successive discrete tones within the received tone set;
- determining an optimal incoming path for each state determined in the first determining act;
- deriving an optimal trace back path through the states processed in the second determining act; and
- discretely executing the first and second determining acts and the deriving acts to discretely decode each of the at least two sub-channels; thereby avoiding overlap in decoding of the at least two channels.

12. The method of claim 9, wherein the identifying act further comprises:
calculating noise margins of the received tone set based on per tone bit loading and per tone signal to noise ratios.

13. The method of claim 9, further comprises:
trellis encoding in each successive symbol interval transmitted data from at least two channels differing from one another in a relative noise margin for associated tones; and
terminating the trellis in an identifiable state at a tone boundary between the at least two channels.

14. The method of claim 9, wherein the decoding act further comprises:
determining a branch metric for a received set of tones;
determining a discrete scale factor for each tone among the received set of tones based on an associated noise margin of the associated channel; and
scaling the branch metrics determined for the received set of tones in the first determining act in binary increments in correspondence with the discrete scale factors determined in the second determining act by effecting a corresponding left or right shift of the branch metrics determined for the received set of tones in the first determining act.

15. The method of claim 9, wherein the decoding act further comprises:
determining a branch metric between each possible state associated with successive discrete tones within the received tone set;
determining an optimal incoming path for each state determined in the first determining act;
deriving an optimal trace back path through the states processed in the second determining act;
discretely executing the first and second determining acts and the deriving acts in windowed increments having a length less than the length of the tones associated with a channel; and
adjusting the windowed increments to avoid overlap in decoding of the at least two channels.

16. An apparatus for frequency division multiplexed multi-tone modulated communications on a multi-tone transceiver configured to couple to a subscriber line; and the apparatus comprising:
means for identifying within a received tone set, discrete tones each associated with a corresponding one of at least two trellis encoded channels differing from one another in a relative noise margin of associated tones; and
means for discretely decoding each of the at least two channels identified by the identifying means, thereby improving the fidelity of the error correction provided by the trellis encoded channels by discretely processing the identified channels within the received set of tones.

17. The apparatus of claim 16, wherein the means for discretely decoding further comprises:
means for determining for each of the at least two trellis encoded channels corresponding to the tones identified by the identifying means, a discrete scale factor for each channel based on an associated noise margin of the associated tones of the channel; and
means for scaling a branch metric for the discrete tones associated with each channel based on the scale factor determined by the determining means.

18. The apparatus of claim 16, wherein the decoding means further comprises:
means for determining a branch metric between each possible state associated with successive discrete tones within the received tone set;
means for determining an optimal incoming path for each state determined in the first determining means;
means for deriving an optimal trace back path through the states processed by the second determining means; and
means for discretely controlling execution of the first and second determining means and the deriving means to discretely decode each of the at least two sub-channels; thereby avoiding overlap in decoding of the at least two channels.

19. The apparatus of claim 16, wherein the identifying means further comprises:
means for calculating noise margins of the received tone set based on per tone bit loading and per tone signal to noise ratios.

20. The apparatus of claim 16, further comprises:
means for trellis encoding in each successive symbol interval transmitted data from at least two channels differing from one another in a relative noise margin for associated tones; and
means for terminating the trellis in an identifiable state at a tone boundary between the at least two channels.

21. The apparatus of claim 16, wherein the decoding means further comprises:
means for determining a branch metric for a received set of tones;
means for determining a discrete scale factor for each tone among the received set of tones based on an associated noise margin of the associated channel; and
means for scaling the branch metrics determined for the received set of tones by the first determining means in binary increments in correspondence with the discrete scale factors determined by the second determining means by effecting a corresponding left or right shift of the branch metrics determined for the received set of tones by the first determining means.

22. The apparatus of claim 16, wherein the decoding means further comprises:
means for determining a branch metric between each possible state associated with successive discrete tones within the received tone set;
means for determining an optimal incoming path for each state determined by the first determining means;
means for deriving an optimal trace back path through the states processed by the second determining means;
means for controlling execution of the first and second determining means and the deriving means in windowed increments having a length less than the length of the tones associated with a channel; and
means for adjusting the windowed increments to avoid overlap in decoding of the at least two channels.

* * * * *

UNITED STATES PATENT AND TRADEMARK OFFICE
CERTIFICATE OF CORRECTION

PATENT NO. : 8,498,326 B1
APPLICATION NO. : 12/804545
DATED : July 30, 2013
INVENTOR(S) : Simanapalli et al.

It is certified that error appears in the above-identified patent and that said Letters Patent is hereby corrected as shown below:

In the Specification

In Column 9, Line 6, delete "'cosec'." and insert -- 'coset'. --, therefor.

Signed and Sealed this
Twenty-second Day of October, 2013

Teresa Stanek Rea
*Deputy Director of the United States Patent and Trademark Office*